United States Patent [19]

Boeckel

[11] Patent Number: 4,507,110
[45] Date of Patent: Mar. 26, 1985

[54] ADJUSTABLE PHOTOSENSOR MOUNTING ARRANGEMENT FOR A CENTRIFUGE

[75] Inventor: John W. Boeckel, Hamden, Conn.

[73] Assignee: E. I. Du Pont de Nemours and Company, Wilmington, Del.

[21] Appl. No.: 543,757

[22] Filed: Oct. 20, 1983

[51] Int. Cl.³ .............................................. H02D 5/06
[52] U.S. Cl. .................................... 494/10; 318/313; 324/175
[58] Field of Search ........................ 68/13, 23 R, 23.1; 248/542, 543, 574, DIG. 4; 318/313, 326, 463, 480; 324/160, 175; 494/7, 8, 9, 10

[56] References Cited

U.S. PATENT DOCUMENTS

| | | | |
|---|---|---|---|
| 1,726,244 | 8/1929 | Shefstead | 248/574 |
| 3,436,637 | 4/1969 | Ehret | 318/449 |
| 3,693,023 | 9/1972 | Wasserman | 324/175 |
| 3,873,216 | 3/1975 | Gropper et al. | 356/243 |
| 3,886,354 | 5/1975 | Swiden et al. | 324/175 |
| 3,921,047 | 11/1975 | Carter et al. | 318/313 |
| 4,205,261 | 5/1980 | Franklin | 494/10 |

Primary Examiner—Robert W. Jenkins
Assistant Examiner—Arthur D. Dahlberg

[57] ABSTRACT

A mounting arrangement for a rotor speed photosensor assembly includes a mounting ring fixedly attached to the stationary element of the centrifuge. The mounting ring has a cutout portion thereon which is adapted to receive a photosensor mounting board which carries the photosensor assembly. Adjustable mounting elements connect the photosensor mounting board to the mounting ring and permit the precise adjustment of the sensor with respect to the ring to thereby dispose the sensor in a predetermined optimal speed-sensing relationship with respect to the rotor.

4 Claims, 8 Drawing Figures

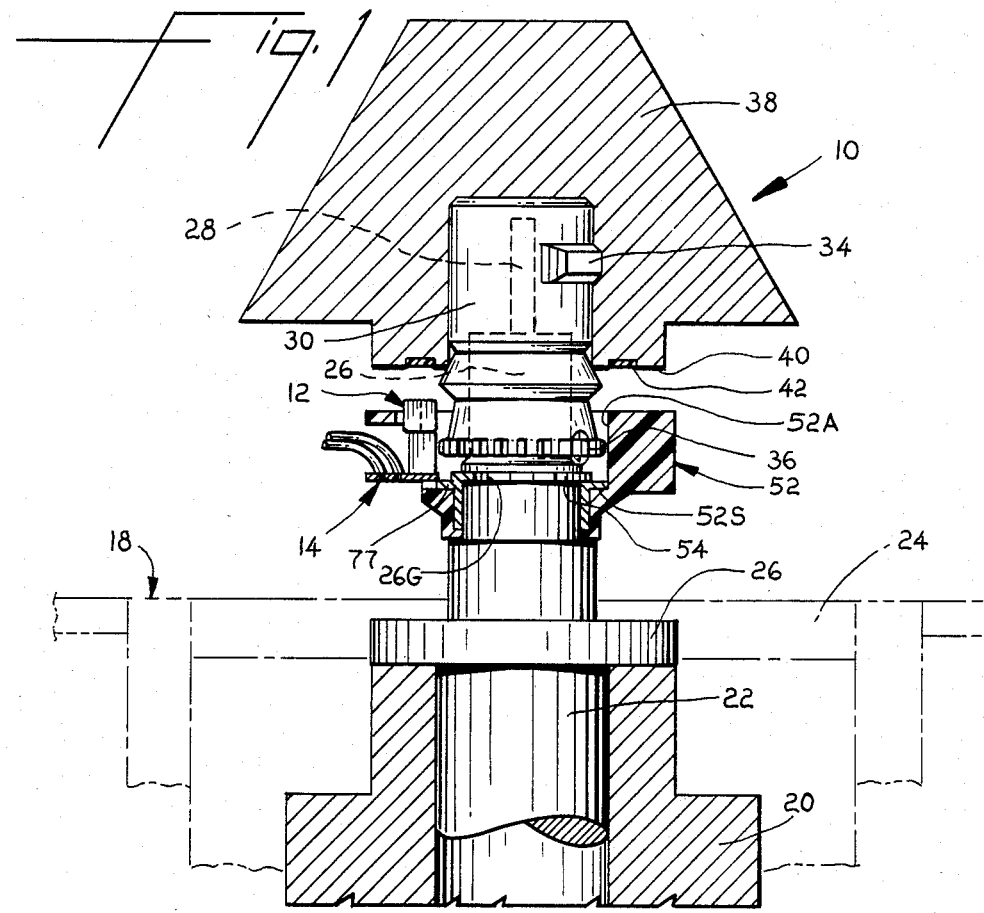
Fig. 1
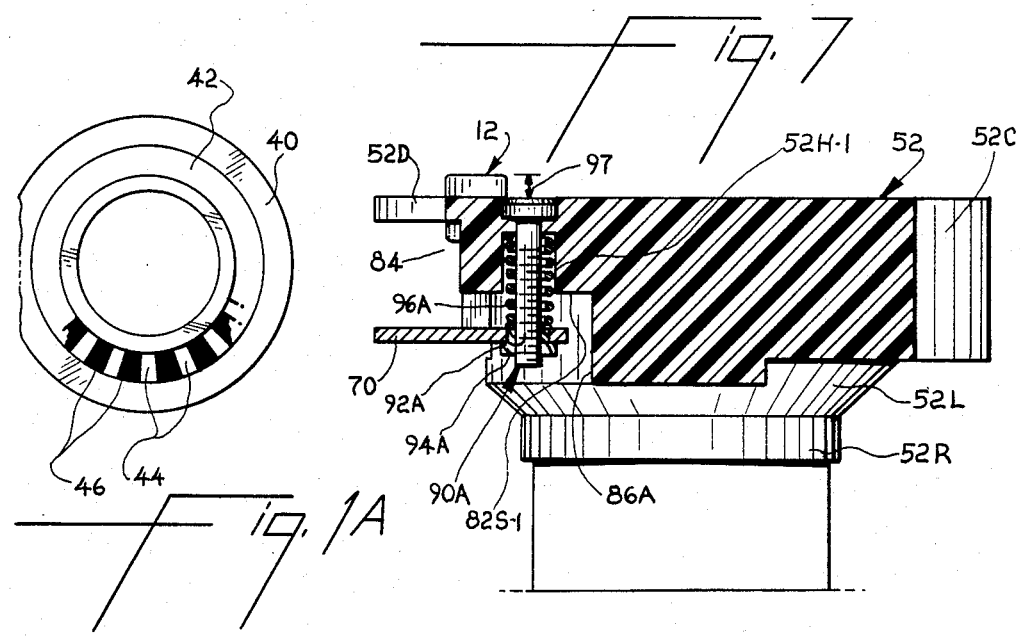
Fig. 1A
Fig. 7

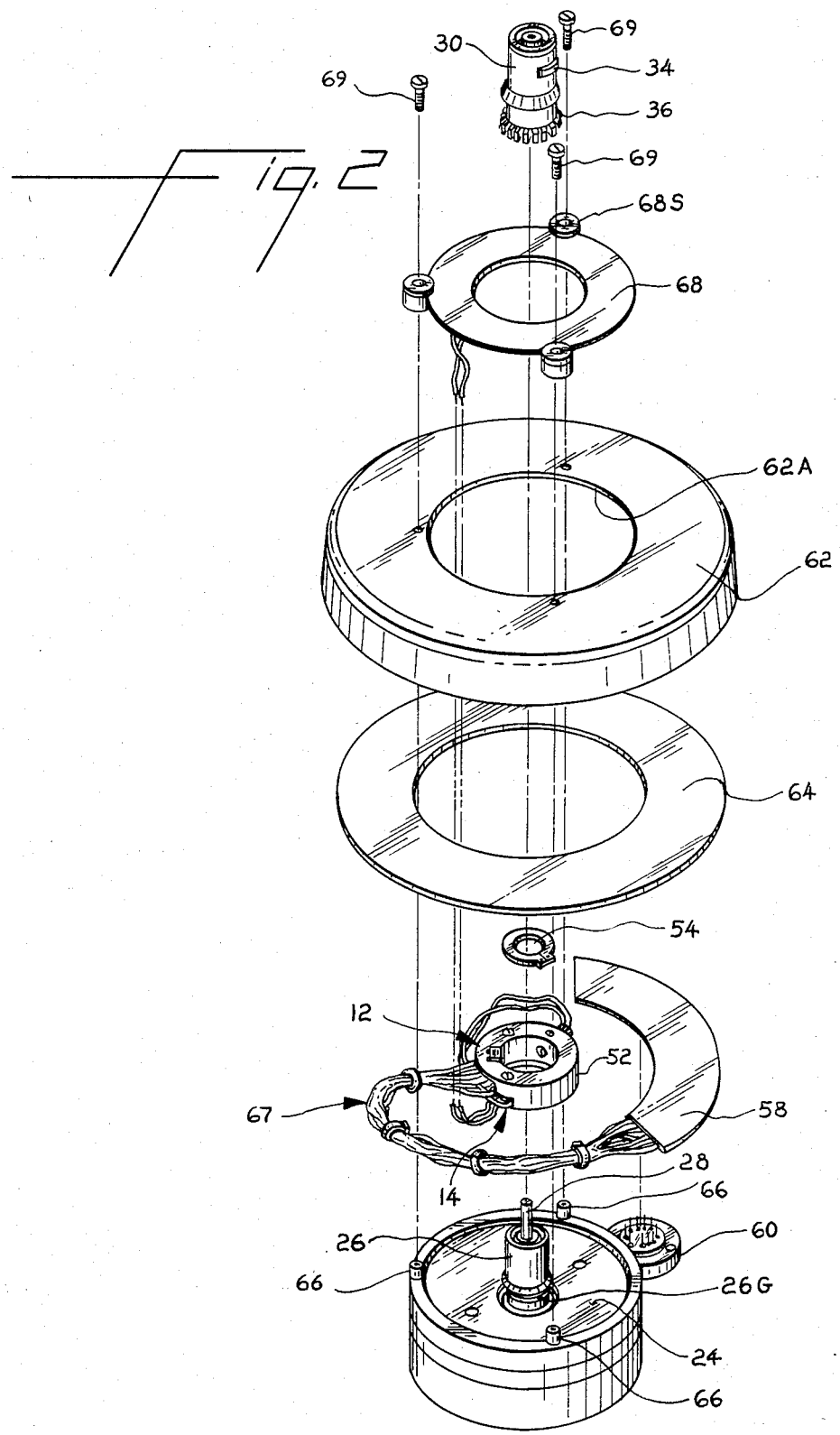

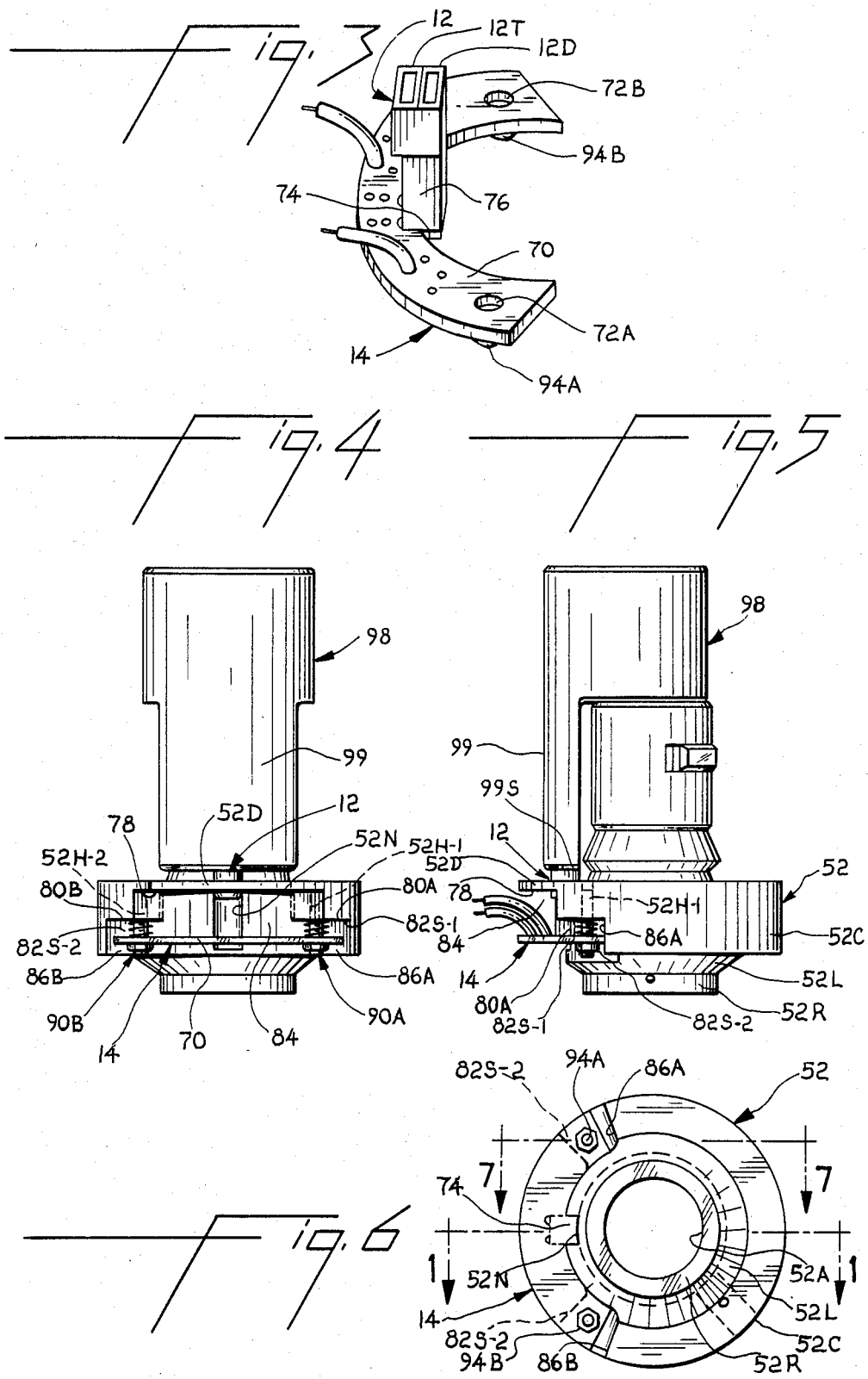

ADJUSTABLE PHOTOSENSOR MOUNTING ARRANGEMENT FOR A CENTRIFUGE

FIELD OF THE INVENTION

This invention relates to a mounting arrangement for mounting a photosensor assembly used to monitor the rotational speed of a rotor element of a centrifuge.

BACKGROUND OF THE INVENTION

The rotational speed at which a centrifuge rotor is moving may be monitored by the use of a photosensor assembly comprising a phototransmitter, such as a light emitting diode (LED), and a photodetector, such as a phototransistor. The photosensor assembly is mounted with respect to the underside of the rotor element on a mounting ring which is fixed with respect to the rotor. The underside of the rotor carries a speed indicia in the form of a banded speed decal having alternate radially extended contrasting colors thereon. One of the bands of the decal is light reflective while the other band is light absorptive. The passage of the alternately colored bands past the photosensor assembly results in the generation of a pulse train the frequency of which is representative of the rotational speed of the rotor.

The phototransmitter and the photodetector are typically mounted in the same housing and must be carefully positioned with respect to the undersurface of the rotor. This care is required because the photodetector portion of the photosensor assembly is particularly position sensitive. That is to say, slight misadjustments in the optimum spacing between the underside of the rotor element and the photosensor assembly may result in the photodetector losing sensitivity and thereby being unable to accurately respond to the radiation reflected from the speed indicia. As an example of the care required, it is not uncommon to require accuracy on the order of ten thousandths (0.010) of an inch when mounting the photosensor assembly. However, because of tolerance variations present in the various constituent elements of the centrifuge apparatus, meeting this tolerance level requires accuracy in a relatively large number of various dimensional adjustments in order to insure the optimal positioning of the photosensor assembly with respect to the rotor. Of course, such dimensional criticality mandates an extremely costly manufacturing procedure, which is perceived to be disadvantageous.

Accordingly, it is believed to be desirable to provide a mounting arrangement for the photosensor assembly to facilitate the mounting and adjustment of the position of the photosensor assembly with respect to the rotor.

SUMMARY OF THE INVENTION

The present invention relates generally to a mounting arrangement for a photosensor assembly used to monitor rotor rotational speed. For this purpose, the rotor is provided on the undersurface thereof with a speed sensing indicia, e.g., a speed decal. The mounting arrangement includes a photosensor mounting ring fixedly connectable on the centrifuge stator so as to lie within a predetermined range of distances with respect to the speed sensing indicia on the undersurface of the rotating element of the centrifuge. The photosensor assembly is itself carried on a sensor mounting board. The photosensor mounting board includes a ledge sized to receive a photosensor assembly therein. The photosensor mounting board is connected to the mounting ring through a pair of adjustment elements disposed at each end of the mounting board. Manipulation of the adjustment elements displaces the photosensor mounting board with respect to the mounting ring to thereby cooperably bring the photosensor assembly into a predetermined optimal speed-sensing relationship with respect to the indicia.

BRIEF DESCRIPTION OF THE DRAWINGS

The invention will be more fully understood from the following detailed description thereof taken in connection with the accompanying drawings which form part of this application and in which:

FIG. 1 is a side elevational view entirely in section of a centrifuge having a photosensor assembly mounted in accordance with the present invention, while FIG. 1A is a bottom view of a portion of the undersurface of the rotor illustrating the speed-sensing indicia disposed therein;

FIG. 2 is an exploded view of a portion of the structure shown in FIG. 1;

FIG. 3 is a perspective view of the sensor mounting board which carries the photosensor assembly;

FIGS. 4 and 5 are, respectively, a front and a side elevational view of the photosensor mounting ring having the photosensor assembly mounted thereto;

FIG. 6 is a bottom view of the mounting ring shown in FIG. 5; and

FIG. 7 is a side section taken along section lines 7—7 in FIG. 6 showing an enlarged view of the manner in which the photosensor is mounted with respect to the photodetector mounting ring.

DETAILED DESCRIPTION OF THE INVENTION

Throughout the following detailed description similar reference numerals refer to similar elements in all figures of the drawing.

With reference to FIG. 1 shown in side elevation is a centrifuge rotor generally indicated by reference character 10 having a speed-detecting photosensor assembly 12 carried by a photosensor mounting board assembly 14 adjustably mounted in accordance with the present invention. The centrifuge 10 includes a stationary framework, or stator, indicated schematically by reference character 18. The stator 18 includes a drive housing portion 20 which receives a drive cartridge 22. These elements are contained within a vacuum seal assembly housing 24. The drive cartridge 22 contains a suitable source of rotational energy such as an oil turbine or other motive source (not shown). The drive cartridge 22 is covered by a top cap 26. The rotational output from the motive source is conducted via a shaft 28 to a mounting spud 30. The spud 30 has a spring loaded locking detente 34 thereon. An array of teeth 36 is provided on the periphery of the spud 30 for use by an alternate, magnetic speed sensing arrangement.

A rotating element or rotor 38 is removably mounted to the spud 30. The undersurface 40 of the rotor 38 is provided with a speed indicia such as a decal 42. As shown in FIG. 1A, which is a fragmentary bottom view of the rotor 38, the speed decal 42 includes a pattern having alternate radially extending bands of a light-reflective and light-absorptive material as indicated by reference characters 44 and 46, respectively.

As seen in connection with FIGS. 1 and 2 the top cap 26 extends upwardly from the upper surface of the seal assembly housing 24. The drive shaft 28 is suitably mounted for rotation on bearings (not shown). The shaft 28 extends through and above the top cap 26 for a distance sufficient to receive the rotor 38 on the spud 30 in a manner which permits rotation of the rotor 38 without interference with the centrifuge stator 18. A photosensor mounting ring 52 is non-rotationally mounted to the top cap 26 by a lock washer 54. The attachment of the photosensor assembly 12 and mounting board 14 to the ring 52 in accordance with this invention will be described in more detail herein.

A printed circuit board 58 (FIG. 2) of arcuate configuration carrying circuit elements for various centrifuge control functions is received by a pin connector 60 that is disposed radially adjacent to the exterior of the seal assembly housing 24. The connector 60 is connected to the centrifuge control network (not shown). A cover 62 having an insulation ring 64 disposed therebeneath is mounted on projections 66 on the seal assembly 24 so as to surround the exterior of the same and to support the insulating ring 62 over the board 58 and ganged wiring emanating therefrom. These members are omitted from FIG. 1 for clarity of illustration. The cover 62 has an aperture 62A. The photosensor mounting ring 52 projects with an annular clearance upwardly through the central aperture 62A. The annular clearance between the mounting ring 52 and the cover 62 is closed by a heat shield 68 (also not shown in FIG. 1 for clarity of illustration). The heat shield 68 carries array of standoffs 68S thereon. The standoffs 68S receive threaded screws 69 which extend into the projections 66 to secure the entire structure in its assembled relationship.

The photosensor assembly 12 and the mounting board 14 therefor are believed best seen in FIG. 3. The mounting board 14 takes the form of an arcuate printed circuit board 70 having mounting apertures 72A and 72B at each end thereof. A ledge 74 is provided substantially midway along the inner edge of the board 70. The photosensor assembly 12 is mounted on a spacer block 76. The block 76 is adhesively secured to the ledge 74. The photosensor assembly 12 is preferably of the type which includes a phototransmitter 12T and a photodetector 12D thereon. Suitable for use as a phototransmitter and photodetector are the devices made by TRW Optron sold under model numbers OPB-706/707. The leads from the sensor assembly 12 are soldered to the board 70. These leads are connected by conductors included within the ganged wiring 67 which leads to the board 58 and, via the pin connector 60, to the centrifuge control.

As seen in FIGS. 3 through 7, the photosensor mounting ring 52 is a substantially annular member having a cylindrical upper portion 52C and a conical lower portion 52L that terminates in a lower rim 52R. The ring 52 has a central aperture 52A therethrough. The aperture 52A is sized to accept the top cap 26. The snap lock washer 54 is received on a steel washer 77 (FIG. 1) itself received by a shoulder 52S which is provided on the ring 52. The washer 54 is accepted by a groove 26G on the outer surface of the top cap 26.

The cylindrical upper portion 52C is undercut, as at 78, for a first axial distance (measured relative to the axis of the ring 52) leaving a disk-like arcuate plate 52D. The portion 52C is further undercut, as at 80A and 80B, for a second axial distance to define shoulder surfaces 82S-1 and 82S-2 that are circumferentially adjacent to (but axially spaced from) the undersurface of the disk-like plate 52D (FIG. 6). The cutout region 84 (FIG. 7) defined between radial surfaces 86A and 86B is angularly coextensive with the angular dimension of the mounting board 70. Mounting openings 52H-1 and 52H-2 extend through the ring 52 in a direction parallel to the axis of the ring 52. A notch 52N is provided in the ring 52. The notch 52N is sized to closely receive the spacer block 76 which carries the photosensor assembly 12.

As noted earlier the sensitivity of the photodetector 12D is dependent in large measure upon the spacing between the speed decal 42 on the undersurface 40 of the rotor 38 and the photodetector 12D. Heretofore, it is required that precise tolerances be maintained while assembling each of the above-described elements during the manufacture of the rotor in order to insure that the optimal spacing is defined between these elements. However, with the mounting arrangement in accordance with this invention the requirement of such precision during assembly of the centrifuge is no longer required.

In accordance with this invention mounting board 70, having the sensor assembly 12 secured thereto, is affixed to the ring 52 by first and second adjusting elements 90A and 90B, respectively. The first and second adjusting elements preferably take the form of threaded screws 92A and 92B which extend through the apertures 52H-1 and 52H-2 in the ring and through the apertures 72A and 72B in the mounting board 70. The screws 92 are secured by corresponding lock nuts 94A and 94B disposed on the undersurface of the mounting board 70. The lock nuts 94 (preferably PEM nuts) are fixed to the undersurface of the board 70. First and second compression springs 96A and 96B are respectively disposed about each of the screws 92 to bias the board 70 with respect to the ring 52. Depending upon the degree to which the adjusting screws 92 are threaded onto their associated lock nuts 94 the clearance dimension 97 (FIG. 7) defined between the top surface of the sensor assembly 12 and the upper surface 52S of the mounting ring 52 may be varied. In this manner the sensor assembly 12 may be brought into the optimal distance relationship from the rotor 38, thereby optimizing the operation of the photodetector 12D.

In practice, the setting of the sensor 12 with respect to the undersurface 40 of the rotor 38 may be understood by reference to FIG. 5. When the sensor assembly 12 is initially mounted to the ring 52 and the ring 52 mounted to the top cap 26, the ring 52 and, therefore, the sensor assembly 12 mounted thereto, lies within a predetermined range of distances from the undersurface 40 of the rotor 38. With the rotor spud 30 secured to the shaft 28 a height setting gauge 98 (FIGS. 4 and 5) is disposed over the top surface of the spud 30. The gauge 98 includes an extension 99. The undersurface 99S of the extension 99 is arranged to lie a predetermined distance below the sput 30 at a distance which defines the optimal clearance distance between the sensor assembly 12 and the speed decal 42. With the gauge 98 thus positioned the adjusting elements 92 are manipulated to displace the mounting board 70 with respect to the mounting ring 52. In this manner the sensor assembly 12 may be expeditiously, repeatably and accurately brought into the predetermined optimal relationship with respect to the undersurface 40 of the rotor 38.

Those skilled in the art having benefit of the teachings as hereinabove set forth may effect numerous modifications thereto. These modifications are, however, to be construed as lying within the scope of the present invention as defined by the appended claims.

What is claimed is:

1. In a centrifuge having a stator, a rotor mounted for rotation about an axis of rotation with respect thereto, and a speed sensor mounted to the stator and operable to generate a signal representative of the rotational speed of the rotor, the improvement which comprises:

an adjusting element cooperably associated with the sensor to displace the same with respect to the stator in a direction parallel the axis of rotation to thereby locate the sensor in the optimal speed-sensing position with respect to the rotor.

2. In a centrifuge having a stator, a rotor mounted for rotation about an axis of rotation with respect to the stator, a rotor speed indicia affixed to the undersurface of the rotor, and a rotor speed sensor assembly carried by a mounting board, the improvement which comprises:

first and a second adjusting elements connected to the sensor mounting board, each adjusting element being cooperable to displace the mounting board with respect to the stator in a direction parallel the axis of rotation to thereby bring the sensor into a predetermined optimal speed-sensing relationship with respect to the indicia on the undersurface of the rotor.

3. In a centrifuge having a stator, a rotor mounted for rotation about an axis of rotation with respect to the stator, a rotor speed sensing indicia affixed to the undersurface of the rotor, and a rotor speed photosensor assembly carried by a mounting board, the improvement which comprises:

a photosensor mounting ring adapted to be fixedly attached to the stator within a predetermined range of distances from the undersurface of the rotor, the ring having a cutout therein sized to receive the sensor mounting board; and a first and a second adjusting elements connected to the sensor mounting board, the adjusting elements being cooperable to displace the mounting board with respect to the mounting ring in a direction parallel the axis of rotation to thereby bring the sensor into a predetermined optimal speed-sensing relationship with respect to the indicia on the undersurface of the rotor.

4. The centrifuge of claim 3 wherein each adjusting element comprises:

a threaded bolt receivable by the mounting ring and extensible through the mounting board;

a nut threadedly engageable with the bolt on the undersurface of the mounting board; and a biasing element disposed between the ring and the upper surface of the mounting board to bias the same with respect to the mounting ring.

* * * * *